United States Patent

[11] 3,560,002

| [72] | Inventor | Richard W. Smedley<br>c/o The Smedley Co., 1008 Alann Drive,<br>Joliet, Ill. 60435 |
|---|---|---|
| [21] | Appl. No. | 846,368 |
| [22] | Filed | July 31, 1969 |
| [45] | Patented | Feb. 2, 1971 |

[54] AUXILIARY OIL SEAL
13 Claims, 8 Drawing Figs.

[52] U.S. Cl............................................................. 277/1,
277/128
[51] Int. Cl......................................................... F16j 15/32
[50] Field of Search.......................................... 277/1, 128,
129, 147, 188

[56] References Cited
UNITED STATES PATENTS
1,773,067  8/1930  Ver Planck.................. 277/1

2,907,595  10/1959  Benson et al. ................ 277/1
FOREIGN PATENTS
618,566  4/1961  Canada ...................... 277/1

*Primary Examiner*—Laverne D. Geiger
*Assistant Examiner*—Robert I. Smith
*Attorney*—Wolfe, Hubbard, Leydig, Voit & Osann ABSTRACT: An auxiliary seal, which may be installed upon a gear box and associated shaft or similar apparatus which has developed a fluid leak through a previously installed seal is provided. A wraparound seal member is clamped into place by a circumferential clamp and a settable plastic material retains both parts in position upon the shaft adjacent the leaking seal. The settable plastic material adheres to the housing wall adjacent the shaft, but does not adhere to the shaft itself, so as to allow rotation of the shaft in the usual manner.

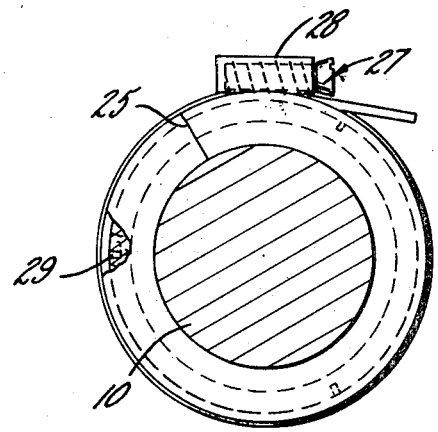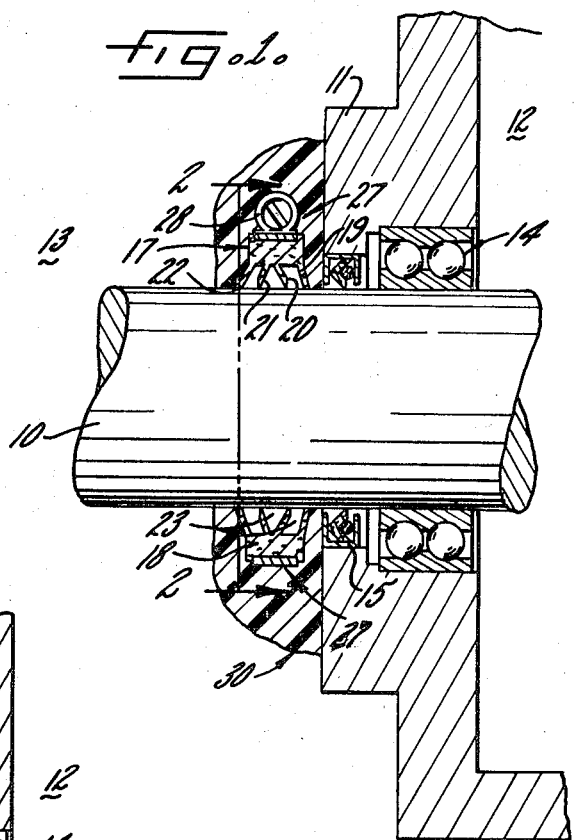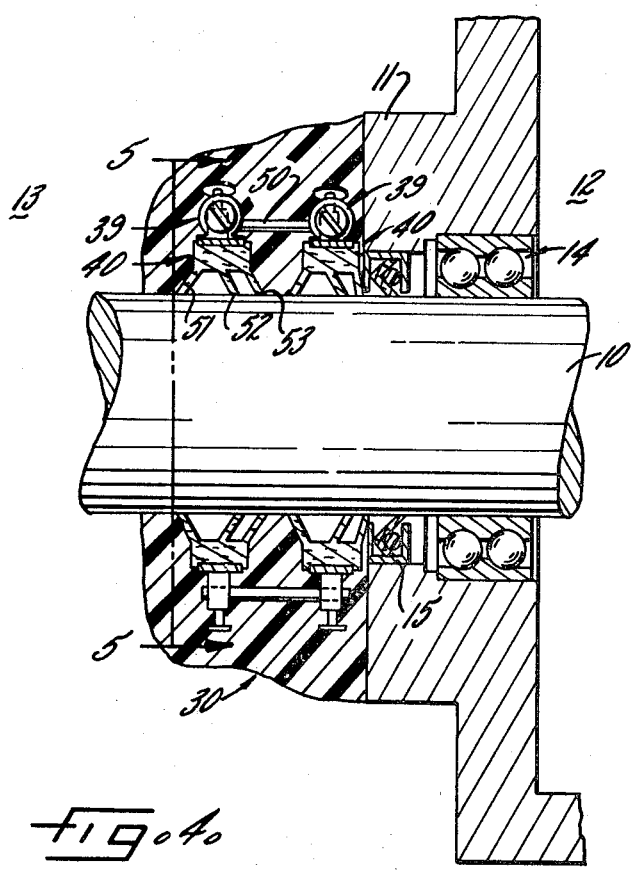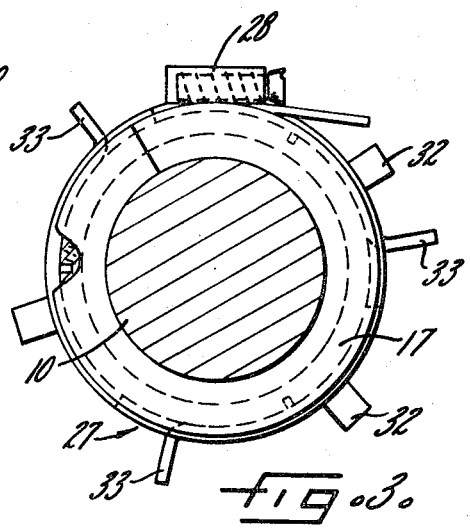

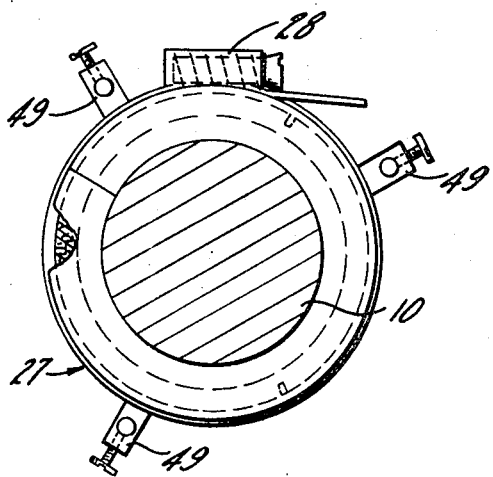
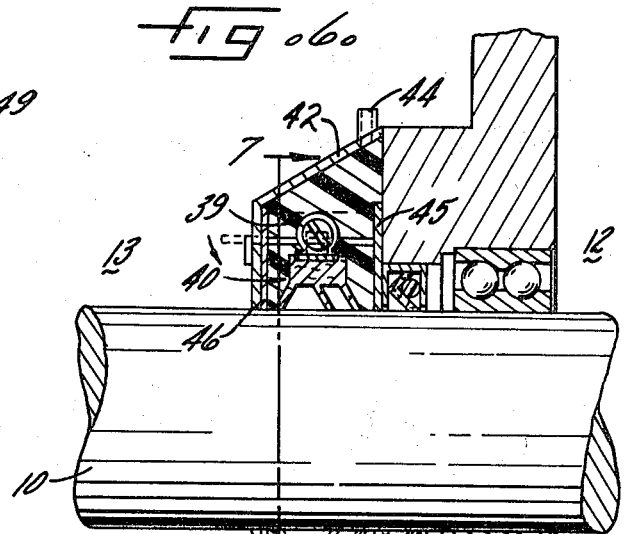
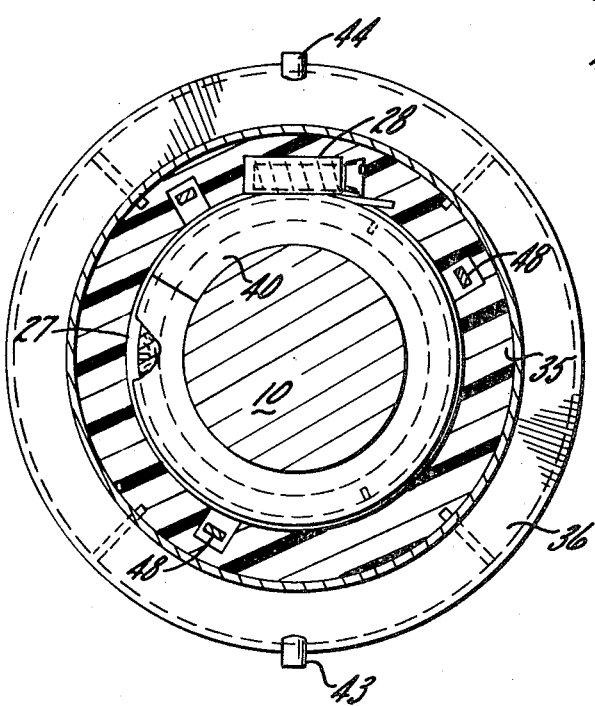
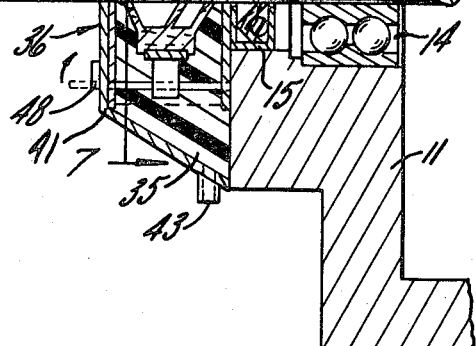
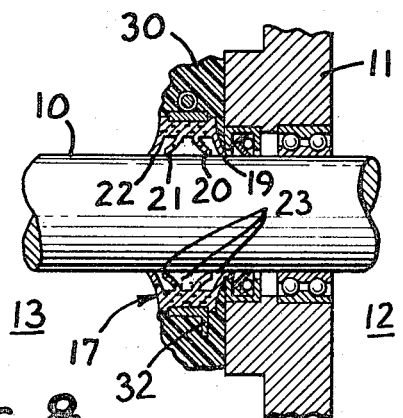

3,560,002

AUXILIARY OIL SEAL

DESCRIPTION OF THE INVENTION

This invention relates generally to oil or fluid seals and more particularly concerns an auxiliary seal which may be used to repair leaking machinery housing journals, without disassembling the entire associated journal or other mechanism.

It has long been the practice in the construction of devices such as, for example, gear boxes, pumps, engines, and other devices, to provide an oil seal member at the junction of the apparatus housing wall and shaft which protrudes through the wall. The function of this seal member is to retain within the device the oil, lubricants or other fluids which are contained, often under pressure, therein. In some applications it is also the function of this seal to keep foreign material from passing from the outside environment to the bearings, gears, and other parts located within the housing. Although a large number of designs for this seal member have been advanced, such members are still widely prone to rapid wear. Such wear ultimately results in the oil or other fluid contained within the associated device leaking out at the junction of shaft and housing. Also, in some cases, the worn seal allows dirt to work into the housing interior.

Heretofore, in order to repair this seal leak, it has been necessary to disassemble the pump, gear box, or other apparatus wherein the seal member is located in order to remove the old seal and replace it with a new one. Such disassembly and reassembly is, of course, time consuming, messy, and expensive. Additionally, these devices are often located in places which are difficult for repairmen to reach. Furthermore, the gear box or other device cannot be used during this time-consuming repair process, which adds further to the expense of removing and replacing the originally installed oil seal.

It is therefore the primary aim of this invention to provide a method and apparatus for rapidly, easily, and inexpensively repairing oil seal leaks such as often occur in transmissions, gear boxes, pumps, or the like.

More specifically, it is an object to provide a method and associated apparatus whereby an oil seal leak may be rapidly repaired without removing and replacing the old oil seal member or, indeed, without dismantling or disturbing the associated machinery in any way.

Other objects and advantages of the invention will become apparent upon reading the following detailed description and upon reference to the drawings, in which:

FIG. 1 is a fragmentary sectional view showing a typical gear box or pump housing wall through which a typical shaft extends, the wall and shaft being equipped with a typical original oil seal member and with the novel auxiliary seal apparatus.

FIG. 2 is a sectional view taken along line 2-2 of FIG. 1, showing an elevational end view of the novel auxiliary oil seal.

FIG. 3 is a sectional view taken along line 2-2 of FIG. 1, showing an alternate form of the auxiliary oil seal clamp.

FIG. 4 is a sectional view similar to FIG. 1, showing another alternate arrangement of the auxiliary oil seal having a plurality of sealing members.

FIG. 5 is a sectional view taken along line 5-5 of FIG. 4, and showing an end view of this alternate arrangement.

FIG. 6 is a sectional view similar to FIGS. 1 and 4, showing yet another alternate construction of the auxiliary oil seal device.

FIG. 7 is a sectional view taken along line 7-7 of FIG. 6, showing an end view of this alternate form of the novel device; and FIG. 8 is a sectional view, reduced in size, similar to FIG. 1, showing a modified embodiment of the apparatus.

While the invention will be described in connection with a preferred embodiment and procedure, it will be understood that I do not intend to limit the invention to that embodiment and procedure. On the contrary, I intend to cover all alternatives, modifications and equivalents as may be included within the spirit and scope of the invention.

Turning first to FIGS. 1 and 2, a typical shaft 10 which extends through a typical housing wall 11 is shown. It will be understood that this wall 11 may be a portion of a gear box casing, and the shaft 10 an input or output shaft connected to the gearing (not shown) within the gear box; or the wall may be a portion of a pump housing, and the shaft a drive shaft for the pump impeller (not shown). Indeed, the invention is intended for use in any location where a shaft or other rotating member extends through a housing wall or relatively nonrotating member, and where fluids must be prevented from escaping from the housing interior 12 of the wall to the outside 13, and where dirt must be prevented from passing from the area 13 outside the housing to the housing interior 12. The typical shaft 10 is conventionally provided with a bearing 14 and a fluid seal 15, which are usually installed in the device at the time of its original fabrication. As discussed above, it is this originally installed fluid seal 15 which is subject to wear and eventual leakage.

In accordance with the invention and to prevent fluid from further leaking through the illustrated original seal 15, a seal member 17 is provided immediately outside the wall 11. The seal member 17 is formed of a flexible material such as rubber or neoprene, and consists of a body portion 18, from which depend several fingers 19, 20, 21 and 22. These fingers may be formed to extend perpendicularly to the seal body member 18 before the seal member 17 is installed. However, in the preferred embodiment, the fingers are formed at an angle of about 30 to 60° with the vertical side, to provide optimum wiping action. Upon installation, these fingers 19-22 are deformed into the positions shown, as is further discussed below. The fingers, thus deformed, exert a constant positive pressure upon the shaft, thus sealingly preventing material from passing axially along the shaft surface under the seal member 17. To be more specific, the outside or exterior fingers 19 and 22 are provided primarily to prevent the settable plastic material from coming in contact with the inside sealing fingers 20 and 21. These exterior fingers preferably are slightly (about one-sixteenth inch to one-fourth inch) longer than the interior fingers 20 and 21, and so deform or splay outwardly slightly more than do the interior fingers, thus providing a number of spaces 23 which allow the sealing members 20 and 21 to flex freely and maintain a tight seal. These spaces may also serve as retaining traps wherein oil or other fluid from inside the device, or dirt or other matter from outside the device may be trapped. The interior fingers 20 and 21 contact the shaft surface with a wiping action, thus providing the requisite fluid-tight seal. It will be understood that a minimum of two exterior and one interior fingers are required to form a satisfactorily sealing mechanism but more fingers, if desired or required by operating conditions, may be provided.

In the preferred embodiment of the invention, the seal member 17 is provided in relatively long striplike lengths. When installation is desired, a portion of the requisite length may be cut from the provided strip, and wrapped into place as illustrated. Alternatively the seal member may be molded or otherwise preformed in the shape of a torus having a slit 25 so that the member may be slipped or worked into the illustrated position about the shaft. To optimize the economical manufacture of these seal members, it may be wise to provide seal members for shafts over 6 inches in diameter in the striplike form, while seal members for smaller shafts may be preformed in the slit toroidal shape. In either embodiment, the seal member may be emplaced without removing the shaft from its associated mechanism, or disassembling the machinery in any way.

Further in accordance with the invention, a clamp member 27 is provided to clamp the sealing member 17 upon the shaft 10 in the described sealing position. This clamp member 27 may be of any suitable circumferentially clamping type; preferably, a member having an infinitely adjustable screw mechanism 28, similar to that used in connection with automobile radiator hoses, is utilized. Preferably, small teeth 29 protrude radially inwardly from the clamp 27 to assist in engaging and retaining the seal member 17 in its clamped sealing position.

Further in accordance with the invention, about the described members is placed a settable plastic material 30, which, after curing or setting, fixedly or adheringly engages the wall 11, slippingly engages the shaft 10, and grippingly and adheringly retains the seal member 17 and clamp member 27 in the illustrated fluid-tight sealing position upon the shaft. Any of a wide variety of settable plastic materials may be used successfully in practicing the invention. I have found that a room temperature-curing urethane with a Shore A hardness of about 85—95 is useful under conditions normally encountered in industrial environments, as is an 80 percent steel particle/20 percent epoxy modifier combination. Another material found useful is a 50 percent polyester resin and 50 percent inert filler combination. Several commercially available products have been found satisfactory for this use. For example, a product known commercially as "Flexane 95" may be used with success, as may a product known commercially as "Devcon A," both of which are marketed by Devcon Corporation, Danvers, Mass. It will be understood that several other products are available which, depending on availability and personal preference, may be successfully employed as well. The essential requirements are that the substance must be initially pliable, so that it can be properly emplaced, and curable or settable, so as to retain the parts in the positions shown. Further, the material, when cured, must adhere to the properly prepared wall, while not adhering to the prepared shaft.

Installation of the seal member is, as may be envisioned, easy. First, the wall 11 adjacent the shaft 10 is prepared so that the settable plastic material 30 will adhere thereto; depending upon the plastic material used, and the nature of the wall to which it is to be applied, this may be done by cleaning the wall and removing all paint, dirt, and grease, and applying a primer of the type and in the manner indicated in the directions for use of the settable material, if necessary. Next, if it is anticipated that the plastic material will contact or engage the shaft 10, as shown in FIGS. 1, 4 and 6, the shaft adjacent the wall is prepared so that the plastic material will not adhere thereto; again, depending on the plastic material used, this may be done by spreading a thin coating of any common machine oil or grease along the shaft. Next, the seal member 17 is located, as described above, about the shaft adjacent the junction of shaft and wall, and the clamp member 27 is secured about the sealing member 17 to retain the sealing member in its leak-sealing position. The settable plastic material 30 is then emplaced around the sealing member, clamp member, and prepared portions of the shaft and wall so that the plastic material, when set, will adhere to the wall, but not to the shaft, and will thereby fix the seal member in its clamped leak-sealing position. Thereafter, the plastic material is allowed to set into a substantially rigid condition, whereupon the pump or gear box may be returned to service.

Several alternate forms and arrangements of the device may be provided without departing from the spirit and scope of the invention. For example, lug members 32 and 33 may be provided upon the clamp member 27, which protrude into the settable plastic material 30, thereby aiding in fixing the clamp member within the settable plastic material. The lugs 32 assist in preventing movement of the clamp 27 and associated seal 17 in an axial direction along the shaft, while the lugs 33, positioned perpendicularly relative to the lugs 32, assist in preventing the clamp and seal from rotating with the shaft 10 as the shaft is spun.

Another embodiment of the invention is illustrated in FIGS. 6 and 7, wherein a liquid or only slightly viscous settable material 35 may be employed, which will not by itself remain in its emplaced position until after the setting process has begun. Such material may be the materials referred to above but in an initially less viscous state. This embodiment will allow using a preengineered mold and will thus insure that the correct quantity of material is used and is emplaced correctly, even when the invention is practiced by inexperienced personnel.

In this embodiment, a mold 36 is located about the shaft at the junction of the shaft and wall after the clamp member 39 has been secured about the sealing member 40, in the illustrated position. The mold 36 thus retains the plastic material 35 in the clamp and sealing member locating position while it is setting. Preferably, the mold 36 is of the "split" variety, having two halves 41 and 42 so that it may be emplaced about the shaft without disturbing the installation thereof. After the mold is emplaced, the settable material may be injected through an opening or nipple 43 while entrapped air escapes through another opening 44. After the plastic material 35 has set, the mold 36 may, if so desired, be removed; since the mold need only be a temporary device, it may be constructed of any suitable light and inexpensive material.

In carrying out this particular embodiment of the invention, temporary seal members 45 and 46 may, if required, be located at the axial junction of the plastic material 35 and the shaft so as to retain the plastic material within the mold 36 while it sets. In this manner, the material 35 will be prevented from running out of the mold by the temporary seal member 46, which preferably must be provided with a hole 47 slightly larger than the shaft. To prevent the material 35 from leaking past a badly damaged original seal 15 and into the bearings 14, the temporary seal 45 may, if necessary, be used; this temporary seal 45 may, of course, be used without the mold 36. Both temporary seals 45 and 46 can be formed of cardboard or other temporary material so as to fit snuggly about the shaft while the material 35 sets, and thereafter may rapidly wear away to the extent necessary to permit free shaft rotation without effect upon the auxiliary seal. As with the other parts described, the temporary seal members are sized and shaped so as to be emplaced about the shaft without disturbing the installation thereof. In this embodiment, to maintain the mold, clamp, and seal members in proper position both during the setting of the material and thereafter, the illustrated arrangement of small transverse pins 48 and pin retainers 49 which are secured to the clamp 27, may be utilized. In some instances, it may be necessary to seal the mold 36 to the wall 11 to effect a fluid-tight connection.

Yet another embodiment of the invention is illustrated in FIGS. 3 and 4. If the leaking fluid is maintained under a high pressure, as is often the case in a pump, or if for some other reason sealing the leak should prove extraordinarily difficult, a plurality of clamps 39 and seal members 40 may be employed in the manner described above. These members are emplaced and then may be connected, if rigidity requires, by small transverse members 50 so as to retain the plurality of seals in proper position. Close examination of FIG. 4 will also disclose that any desired number of fingers 51, 52 and 53 may be appended to the seal members. As previously described, the outer fingers 51 and 53 serve to exclude the settable material from contacting the inner finger 52. The interior finger 52 or a plurality thereof act as sealing wipers as described above. Since the interior finger or fingers are not abutted by the substantially rigid material 30, they can flex with the small undulations of the shaft surface so as to optimize their sealing effect.

Further, it will be noted that if the original seal member 15 is badly damaged or for some other reason it is deemed desirable, the seal member 40 or 17 may be emplaced so as to abut the old seal or seal retainer, thereby preventing settable material 30 or 35 from contacting the original seal member 15 or entering the bearings 14. Alternatively, the seal members and clamps may be spaced, slightly away from the wall 11, if overhanging portions of the machinery (not shown) so require, so long as the seal member can be adequately clamped into a leak-sealing position and retained therein by the associated parts and settable material.

In some cases, it will be desirable to avoid permitting the settable plastic to come in contact with the shaft, as illustrated in FIG. 8. In this embodiment, all of the fingers 19—22 of the seal act to wipingly stop the axial flow of material—either oil or dirt—along the shaft. Use of a settable plastic holding material which cures or sets to a rigid mass, and the use of antiaxial movement lugs 32 is preferable in this embodiment.

In any of the illustrated embodiments, it will be noted that since all parts have been designed or formed so as to fit around the installed shaft and associated wall without disassembling the installation thereof, oil seal and similar leaks may be easily and inexpensively repaired by the use and practice of this invention.

I claim:

1. An oil seal for providing a fluid-tight junction between a shaft and a wall through which the shaft extends, comprising the combination of a sealing member having a plurality of fingers depending therefrom for engagement with the shaft in a position which will sealingly prevent material from passing axially along the shaft surface under the seal member, a clamp member for clamping the sealing member upon the shaft in its sealing position, and a settable plastic material fixedly engaging the wall and retaining the seal member in its fluid-tight sealing position upon the shaft when the settable material has set in substantially solid form.

2. A device according to claim 1, wherein said clamp member is provided with at least one lug member for protruding into said settable plastic material thereby aiding in fixing the clamp member with respect to the settable plastic material.

3. A device according to claim 1, wherein said sealing member and said clamp member are formed so that they may be emplaced about said shaft without disturbing the installation of the shaft.

4. A device according to claim 1, wherein a temporary seal member is located at the junction of said shaft and said wall for preventing the plastic material from flowing between the shaft and wall while the plastic material sets.

5. A device according to claim 1, wherein is included a mold capable of being fit over the shaft at said junction of shaft and wall for retaining said plastic settable material in position while it sets.

6. A device according to claim 5, wherein said mold is sized and shaped to fit over said shaft without disturbing the installation of the shaft.

7. A device according to claim 5, wherein a temporary seal member is located at the junction of said plastic material and said mold for retaining the plastic material within the mold while the plastic material sets.

8. A device according to either one of claim 4 or claim 7, wherein said temporary seal member is sized and shaped so as to be emplaced about said shaft without disturbing the installation of the shaft.

9. A method of repairing fluid leaks occurring at a junction between a shaft and a wall through which the shaft extends, by means of a seal member, a clamp member, and a settable plastic material, the method comprising the steps of:
   1. preparing the wall adjacent the shaft so that the settable plastic material will adhere thereto;
   2. locating the sealing member about the shaft adjacent the junction of shaft and wall;
   3. securing the clamp member about the sealing member to retain the sealing member in a leak-sealing position;
   4. emplacing the settable plastic material around the sealing member, clamp member and prepared portions of the wall so that the plastic material, when set, adheres to the wall but not to the shaft, and thereby fixes the seal member in its clamped leak-sealing position; and
   5. allowing the plastic material to set into a substantially rigid condition.

10. A method of repairing fluid leaks according to claim 9, wherein is included the step of preparing the shaft adjacent the wall so that the plastic material will not adhere thereto, before the plastic material is applied to prepared portions of the shaft and wall so that the plastic material, when set, will not adhere to the shaft.

11. A method according to claim 9, including the step of locating a temporary seal member at the junction of said wall and shaft so as to prevent the plastic material from flowing between the shaft and wall.

12. A method according to claim 9, including the step, after the clamp member has been secured about the sealing member, of locating a mold about the shaft at said junction of shaft and wall in a position to retain the plastic material in the clamp and sealing member locating position while it is setting.

13. A method according to claim 12, including the step of locating a temporary seal member at the junction of said plastic material, shaft, and mold so as to retain the plastic material within the mold while the plastic material sets.